United States Patent [19]

Leong

[11] Patent Number: 4,530,440
[45] Date of Patent: Jul. 23, 1985

[54] CONTAINER LID WITH TEMPERATURE RESPONSIVE VENTS

[75] Inventor: Christopher Leong, Cumberland Park, Australia

[73] Assignee: Buxdel Pty. Limited, Adelaide, Australia

[21] Appl. No.: 482,339

[22] PCT Filed: Aug. 3, 1982

[86] PCT No.: PCT/AU82/00121

§ 371 Date: Apr. 1, 1983

§ 102(e) Date: Apr. 1, 1983

[87] PCT Pub. No.: WO83/00476

PCT Pub. Date: Feb. 17, 1983

[30] Foreign Application Priority Data

Aug. 4, 1981 [AU] Australia ............... PF0039

[51] Int. Cl.³ ............................................. B65D 55/00
[52] U.S. Cl. ................................... 220/201; 220/209;
229/43; 229/DIG. 14; 236/92 C; 426/118;
426/403
[58] Field of Search ............... 229/43, DIG. 14;
220/367, 209, DIG. 27, 203, 4 A; 383/45, 100;
426/118, 395, 403; 99/347

[56] References Cited

U.S. PATENT DOCUMENTS

| 2,686,608 | 8/1954 | Rock ................................... 220/4 A |
| 3,047,235 | 7/1962 | Eshbaugh et al. ............... 220/203 X |
| 3,387,765 | 6/1968 | Davis ................................... 229/43 |
| 3,432,087 | 3/1969 | Costello ......................... 426/118 X |
| 3,468,471 | 9/1969 | Linder ........................ 229/DIG. 14 |
| 3,716,180 | 2/1973 | Bemiss et al. ............... 229/DIG. 14 |
| 4,141,487 | 2/1979 | Faust et al. ........................... 229/43 |
| 4,210,674 | 7/1980 | Mitchell ....................... 229/DIG. 14 |

FOREIGN PATENT DOCUMENTS

| 291745 | 4/1967 | Australia . |
| 595306 | 3/1960 | Canada ....................... 229/DIG. 14 |
| 926198 | 5/1963 | United Kingdom ....... 229/DIG. 14 |

OTHER PUBLICATIONS

*Modern Packaging*, Oct. 1949, p. 106.

*Primary Examiner*—William Price
*Assistant Examiner*—Gary E. Elkins
*Attorney, Agent, or Firm*—Cushman, Darby & Cushman

[57] ABSTRACT

A food storage and reheating receptacle (1) with a lid having heat openable apertures (4). Material of lid is such that cut outs on lid tend to bend or deflect from lid surface upon heating thereby causing ventilation of contents of receptacle.

8 Claims, 9 Drawing Figures

FIG. 3
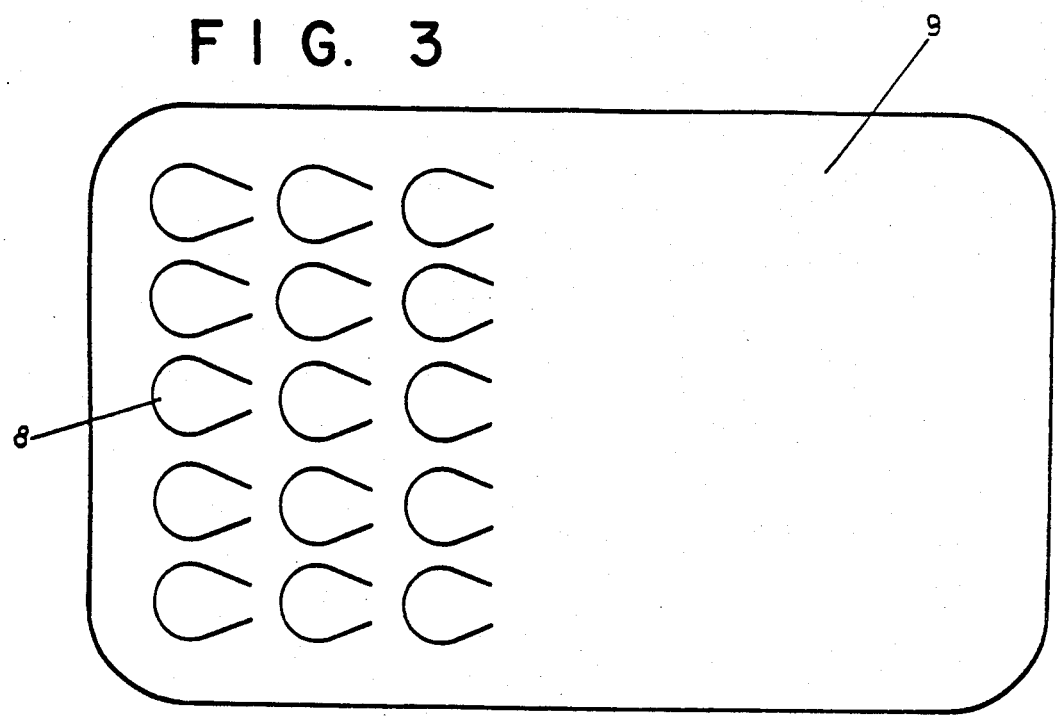
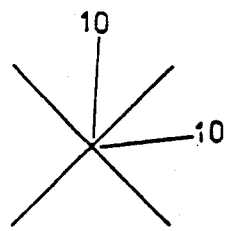
FIG. 4A
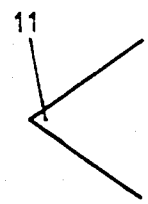
FIG. 4B
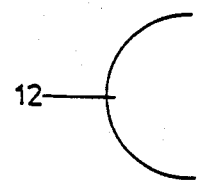
FIG. 4C
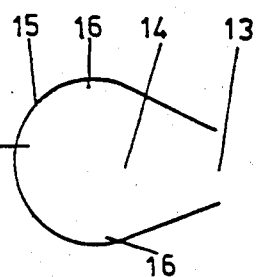
FIG. 4D
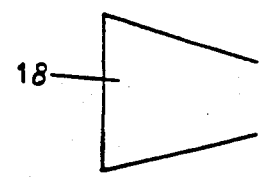
FIG. 4E
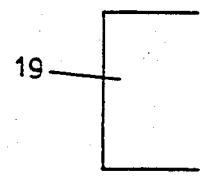
FIG. 4F

CONTAINER LID WITH TEMPERATURE RESPONSIVE VENTS

This invention relates to a lid for a food receptacle and more particularly to a lid for a receptacle in which food is to be heated and also to a food receptacle having such a lid.

There is an increasing market for what may be termed fast foods, that is foods which can be quickly reheated to provide a satisfying meal yet can be stored in a freezer or the like for a considerable period.

A wide variety of food may be frozen and stored in this manner but in the past successful reheating of such foods has only taken place when the food in incorporated in a liquid such as a gravy. It has been found that where crisp foods are required a quandry exists. On the one hand, reheating the food in a sealed container causes a steam build up which makes the food glutinous and unpalatable yet on the other hand if the food is heated without any lid at all too much drying out occurs.

An example of such a food is chinese sweet and sour pork. With this food it is preferable that the meat portions be covered with a crisp batter then have a sweet and sour sauce poured over them. If the sauce is poured over the meat before heating then during the heating the crispness of the batter is lost and this spoils the taste and texture of the food. If the food is heated up in an open container without the sauce poured over the meat then too much drying out may occur and the taste and texture is effected.

It is therefore desirable that the food be heated up with the sauce separate from the meat and for this a two compartment reheat receptacle may be used. There is the further problem then however that if the food is heated up with the lid on then the batter on the meat becomes glutinous and if the food is heated up without any lid on then the sauce dries out.

It should be realised that this invention may be applied to many different food dishes and is not restricted to the example given above.

It is the object of the invention therefore to provide a food reheating receptacle and more particularly a lid for a food reheating receptacle which allows foods for which a crisp texture is required to be heated.

There is the further problem however that it is desirable to make such frozen food packaging as easy as possible to reheat and use and to require a manual step such as for instance to place apertures in a lid of such a container between taking the container from the fridge and placing it in an oven means that at times this would not be done and poor results would be obtained and future potential sales lost. It is therefore commercially and gastronomically desirable, and a further object of this invention, that such a lid for a frozen food receptacle be provided with apertures which will stay closed when the food is in a freezer but upon placing in the oven that the apertures will open.

In its broadest form therefore the invention is said to reside in a disposable lid for use with a disposable food receptacle of the type useful for the storage and heating of foods, the lid including a plurality of heat openable apertures.

In a preferred form of the invention the lid may be of a material or otherwise be such that when closing a container containing moisture containing food and being heated with a food to a selected temperature the heat openable apertures will open to an extent to allow release of moisture from within the container.

In one preferred form the material of the lid is such that two layers through the thickness of the lid will expand or contract at different rates upon the application of the heat and therefore cause deflection of the heat openable apertures.

One preferred material for such a lid is cardboard in which differences in the expansion or contraction of an upper and lower surface of the cardboard is due to drying out of one surface and the other surface remaining moisturised.

In a further preferred form the lid may be of a multi-layered material with at least two of the layers having different coefficients of thermal expansion such that deflection of the heat openable apertures will occur.

One such preferred material may be cardboard having an aluminium foil on one surface thereof.

Such heat openable apertures may comprise in one form a flap portion of the lid defined by a peripheral cut through the thickness of the lid except for a portion of the periphery such that the heat openable aperture is still attached to the main body of the lid.

Such heat openable apertures may have a shape defined by the peripheral cut through the thickness of the lid, selected from a group comprising a U shape, a V shape, a cross shape, a circular shape, a tongue shape and a rectangular shape.

In a further form the invention may be said to reside in a container including a disposable lid having heat openable apertures as defined in any of the preferments mentioned above.

If the food receptacle is of a type having more than one compartment then of course these heat openable apertures need only be placed over that compartment for which ventilation and moisture release during heating is desired.

Another example of a food which may be packaged by this method is a frozen roast dinner which would contain roast meat in one compartment, gravy in another compartment, vegetables in a further compartment and chipped potatoes in a further compartment. In such a package the apertures would be provided about the compartment holding the chipped potatoes but the other compartment. would remain sealed so that drying out would not occur.

It will be realised of course, that this invention is not limited to multi compartment reheating packages but can also be used on single compartment packages where the food in that compartment is of the type that requires moisture loss and or ventilation during reheating.

To more clearly understand the invention however reference will be made to the accompanying illustrations.

In the drawings

FIG. 3 shows a lid having heat openable apertures on only part of its surface and FIGS. 4a through 4f show various shapes suitable for the food reheating receptacle.

Figure 1:
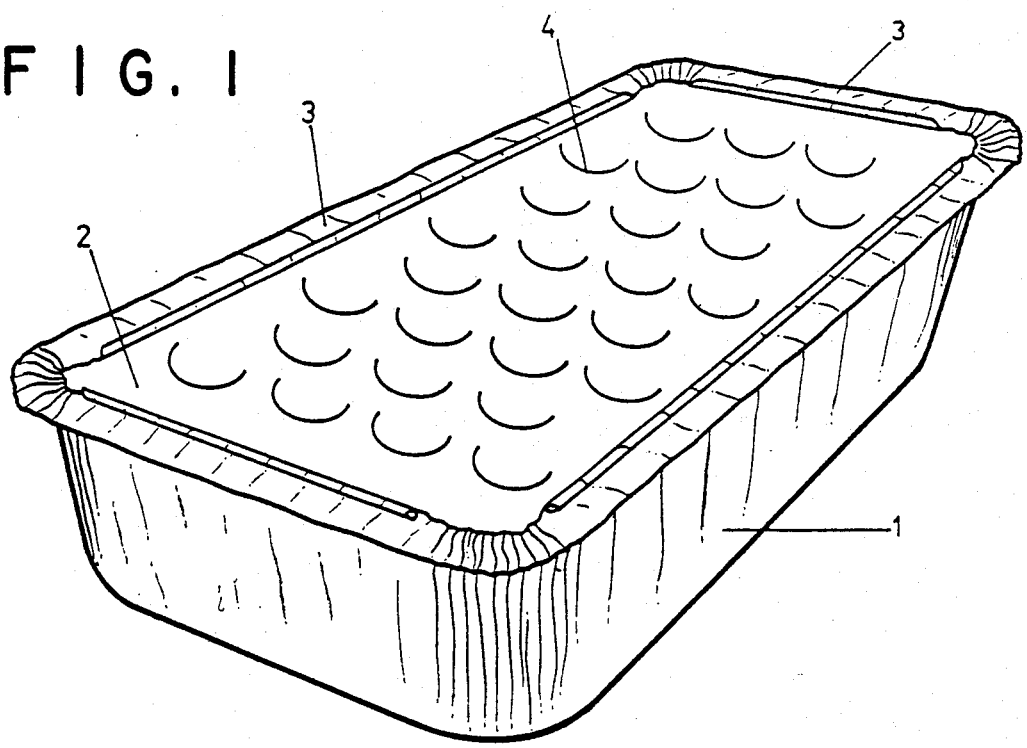
FIG. 1 shows a food reheating receptacle having a lid according to this invention.

Now looking at the drawings in more detail, FIG. 1 shows a food reheating receptacle 1 having a lid 2. The lid 2 is firmly sealed to the receptacle 1 by means of push over edges 3 around the rim of the receptacle 1. The lid 2 has a series of semi-circular cuts 4 which comprise in this embodiment the heat openable apertures. A further discussion of the action of the heat openable apertures will be made with reference to FIG. 4.

Figure 2:
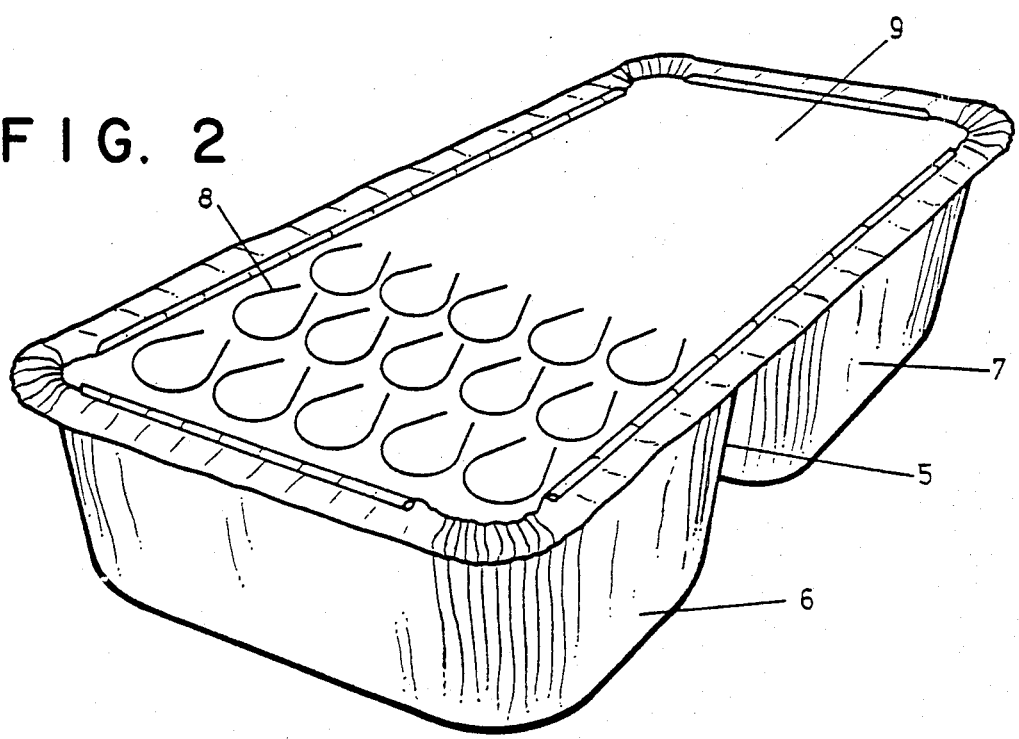
FIG. 2 shows a two compartment reheating receptacle having a lid according to the invention.

FIG. 2 shows a food receptacle 5 having compartments 6 and 7 and a dividing wall therebetween. In this type of receptacle, foods may be heated which have different moisture loss requirements and to facilitate this heat openable apertures 8, in this case of a tongue shape are provided only above the compartment 6.

Upon this receptacle 5 being heated with food in both compartments 6 and 7 the heat openable apertures 8 will tend to open which will allow moisture to escape from the compartment 6 but will keep the compartment 7 sealed.

Looking more closely at the lid 9 of FIG. 2, as shown in FIG. 3 the heat openable apertures 8 are provided in three rows of 5 tongues each so that efficient moisture loss may occur from only that end of the receptacle which is underneath the heat openable apertures 8.

FIG. 4 shows various shapes of heat openable apertures which are useful for this invention.

A shows a crossed cut and in this form the apices 10 of each of the portions between the cuts will tend to deflect either upwards or downwards depending on the material of construction of the lid so as to allow moisture out upon heating.

Form B would act similarly with the region 11 tending to deflect.

In Figure C a semi-circle of cut is provided with deflection occurring at point 12.

With embodiment D only a small tongue 13 of material supports the tongue 14 defined by the cut edge 15. In this embodiment curling may occur either from the sides 16 or at the end 17.

Embodiment E shows a trapezoidal figure and once again curling will occur around the region 18.

Embodiment F shows a rectangular cut out shape and with this embodiment too deflection would occur in the region 19.

The temperatures to which such heat openable lids may be heated are of the same order as those required to reheat the food within the container and hence no special procedures of reheating may be necessary to ensure that such heat openable apertures open.

The claims defining the invention are as follows:

I claim:

1. A disposable lid for use with a disposable food receptacle of the type useful for the storage and heating of food, the lid having at least one vent means which opens by deforming upon the application of heat, the lid being multi-layered with at least two of the layers having different co-efficients of thermal expansion.

2. A disposable lid as in claim 1 wherein the lid is cardboard having an aluminium foil on one surface thereof.

3. A disposable lid as in claim 1 wherein the heat openable vent comprises a portion of the lid defined by a peripheral cut through the thickness of the lid except for a portion of the periphery such that the heat openable vent is still attached to the main body of the lid.

4. A disposable lid as in claim 3 wherein the heat openable vent has a shape defined by the peripheral cut through the thickness of the lid selected from a group comprising a U-shape, a V shape, a cross shape, a circular shape, a tongue shape and a rectangular shape.

5. A container including a disposable lid having heat openable vents as defined in claim 1.

6. A disposable lid for use with a disposable food receptacle of the type useful for the storage and heating of food, the lid having at least one heat openable vent formed by a cut through the lid, the lid comprising at least two layers having different expansion and contraction rates such that the application of heat causes the vent to open.

7. A disposable lid for use with a disposable food receptacle of the type useful for the storage and heating of food, the lid including a plurality of flaps each formed by a cut through the lid, the lid comprising at least two layers having different thermal expansion and contraction rates such that upon the application of heat said flaps deflect and thereby form apertures in the lid.

8. A disposable lid for use with a disposable food receptacle of the type useful for the storage and heating of food, the lid having at least one vent means which opens by deforming upon the application of heat, the lid being made of cardboard and opening of the vent means being due to differences in the expansion or contraction of an upper and a lower surface of the cardboard upon the drying out of one surface which is moist, the other surface remaining unmoisturized.

* * * * *